United States Patent [19]

Mavrikis

[11] Patent Number: 5,232,369

[45] Date of Patent: Aug. 3, 1993

[54] HANDICAPPED DOLL WITH REMOVABLE LIMBS

[76] Inventor: Anna M. Mavrikis, 62-56 60th Rd., Apt. #2, Maspeth, N.Y. 11378

[21] Appl. No.: 930,262

[22] Filed: Aug. 14, 1992

[51] Int. Cl.5 .................. A63H 13/00; G09B 23/28
[52] U.S. Cl. .................. 434/262; 446/296; 434/236
[58] Field of Search .......... 434/262, 274, 236; 446/390, 394, 296, 295, 376, 97, 279, 268, 275, 276, 313, 330, 409, 901

[56] References Cited

U.S. PATENT DOCUMENTS

| | | | |
|---|---|---|---|
| 454,570 | 6/1891 | Moore | 446/276 X |
| 1,566,801 | 12/1925 | Millard | 446/376 X |
| 1,579,367 | 4/1926 | Hymer | 446/390 X |
| 2,472,064 | 6/1949 | Damiano | 446/390 X |
| 2,572,285 | 8/1951 | Schumacher et al. | 446/390 |
| 2,925,684 | 2/1960 | Hausser et al. | 446/376 X |
| 2,959,891 | 11/1960 | Barnett et al. | 446/295 |
| 3,361,310 | 1/1968 | Ziegler et al. | 446/376 X |
| 3,974,593 | 8/1976 | Walker, Jr. | 446/376 X |
| 4,386,479 | 6/1983 | Terzian et al. | 446/276 |
| 5,018,977 | 5/1991 | Wiley et al. | 434/262 X |
| 5,041,050 | 8/1991 | Ritchey et al. | 446/394 |

FOREIGN PATENT DOCUMENTS

| | | | |
|---|---|---|---|
| 7636 | of 1887 | United Kingdom | 446/275 |
| 1430513 | 3/1976 | United Kingdom | 446/901 |

Primary Examiner—Gene Mancene
Assistant Examiner—L. Thomas
Attorney, Agent, or Firm—Richard L. Miller

[57] ABSTRACT

A wheel chair, a handicapped doll having a removable hair piece and removable limbs is provided which consists of a torso with a head attached thereto and two sets of limbs extending from the torso. A mechanism is for adjusting and detaching portions of each limb at major joint locations, so that a handicapped person can identify with and relate to the handicapped doll.

4 Claims, 1 Drawing Sheet

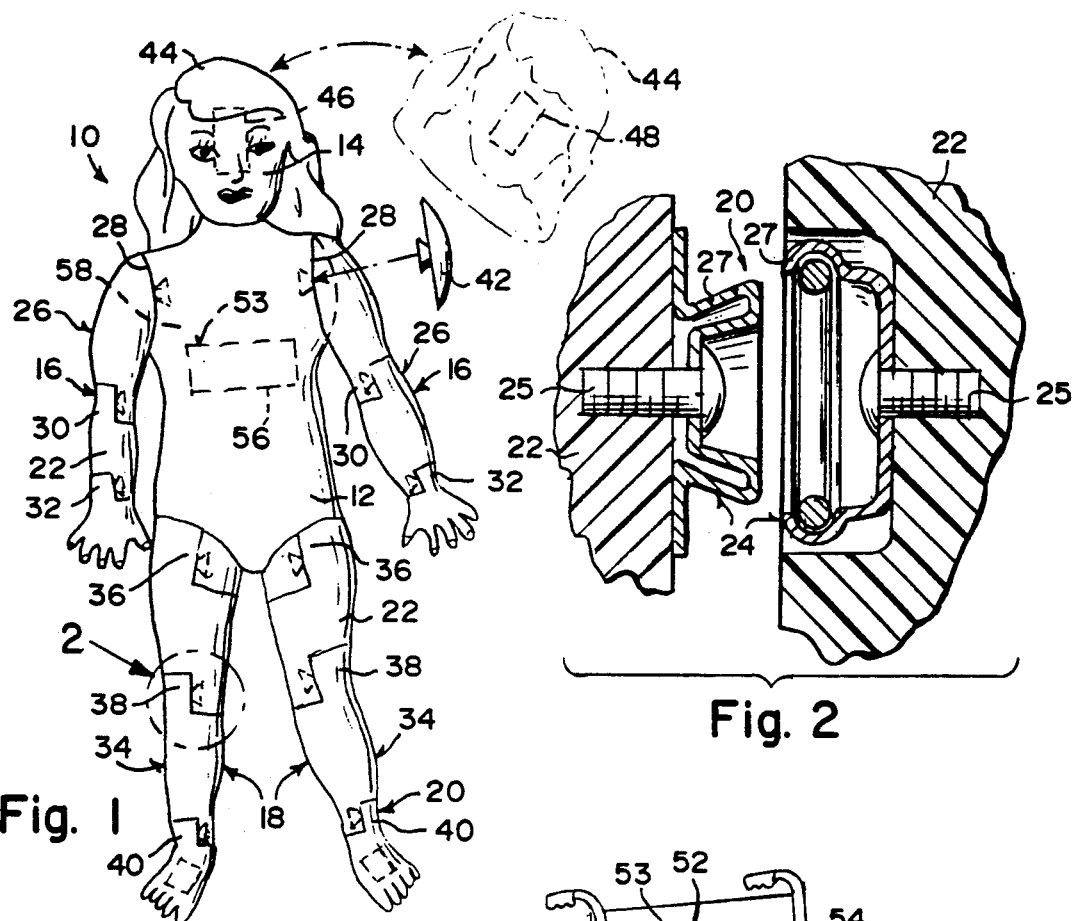
Fig. 1
Fig. 2
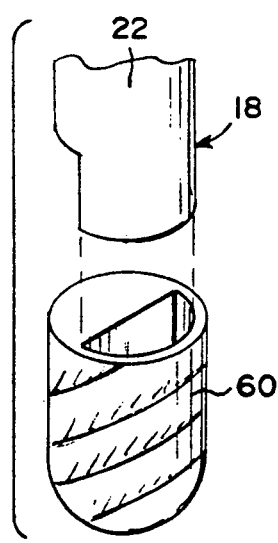
Fig. 3
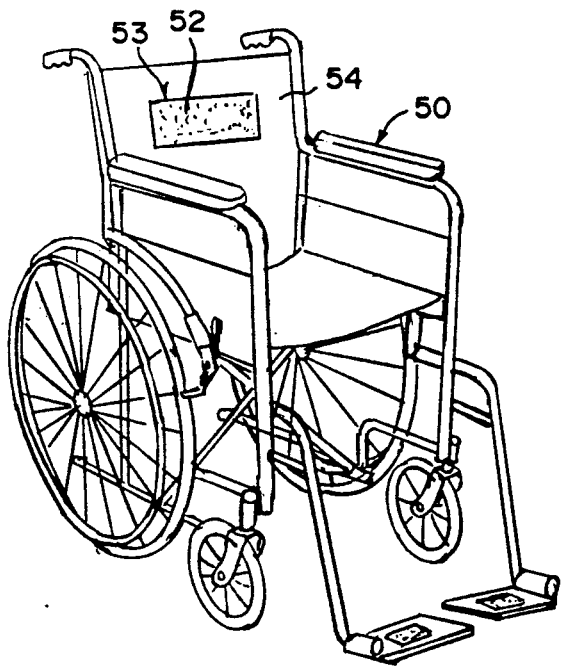
Fig. 4

HANDICAPPED DOLL WITH REMOVABLE LIMBS

BACKGROUND OF THE INVENTION

The instant invention relates generally to injury simulated mannequins and toys and more specifically it relates to a handicapped doll with removable limbs and accessories.

Numerous injury simulated apparatus have been provided in the prior art that are adapted to be utilized in medical and first aid training. For example, U.S. Pat. No. 3,858,351 to Porter; U.S. Pat. No. 3,895,451 to Smrcka and U.S. Pat. No. 4,773,865 to Baldwin all are illustrative of such prior art. While these units may be suitable for the particular purpose to which they address, they would not be as suitable for the purpose of the present invention as hereafter described.

SUMMARY OF THE INVENTION

A primary object of the present invention is to provide a handicapped doll with removable limbs that will overcome the shortcomings of the prior art devices.

Another object is to provide a handicapped doll with removable limbs in which portions of each limb can be disassembled at the major joints, so that the handicapped doll can be made to look like a handicapped person.

An additional object is to provide a handicapped doll with removable limbs that comes with a toy wheelchair, so that the handicapped doll can be retained in the toy wheelchair, allowing the handicapped person that uses a real wheelchair to identify with the handicapped doll.

A yet additional object is to provide a handicapped doll with a removable hair piece so as to simulate a patient with hair loss due to various medical treatments and diseases.

A further object is to provide a handicapped doll with removable limbs that is simple and easy to use.

A still further object is to provide a handicapped doll with removable limbs that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic front elevational view of the doll portion of the instant invention, with a removable hair piece separated therefrom in phantom;

FIG. 2 is an enlarged cross sectional view of the snap fastener pivot joint separated as indicated typically at arrow 2 in FIG. 1;

FIG. 3 is a diagrammatic perspective view of a cap simulated to look like a bandage exploded away from the remaining limb portion; and FIG. 4 is a perspective view of the toy wheelchair portion of the instant invention having mating hook/loop pile fastener material for retaining the doll portion therein.

DETAILED DESCRIPTION OF THE PREFERRED EMBODIMENTS

Turning now descriptively to the drawings, in which similar reference characters denote similar elements throughout the several views, the Figures illustrate a handicapped doll 10 having a torso 12 and a head 14 attached thereto, with two sets of removable limbs 16, 18 extending from the torso 12. A mechanism 20 is for rotatively adjusting the position and detaching portions 22 of each limb 16, 18 at major joint locations, so that a handicapped person can identify with and relate to the handicapped doll 10.

Each adjusting and detaching mechanism 20 is a snap fastener pivot joint 24 having typical two drive screws 25 to hold each of the two parts 27 of the snap fastener pivot joint 24 to the doll.

The first set of limbs 16 are a pair of arms 26 in which the major joint locations are at the shoulders 28, elbows 30 and wrists 32. The second set of limbs 18 are a pair of legs 34 in which the major joint locations are at the thighs 36, knees 38 and ankles 40.

The handicapped doll 10 further includes at least one simulated bandage cap 60 to fit upon one of the remaining limb portions 22. A snap cover 42 fits upon one of the shoulder joint locations 28, when one of the arms 26 is completely detached from the torso 12. A hair piece, wig or simulated bandage 44 is removably attachable to the head 14, typically with hook and loop fabric fastener strips 46 and 48.

As shown in FIG. 4, a toy wheelchair 50 is provided. A first strip 52 of a mating hook and loop pile fabric fastener 53 is attached to the back rest 54 of the toy wheelchair 50. A second strip 56 of the mating hook and loop pile fabric fastener 53 is attached to the back 58 of the torso 12. The handicapped doll 10 can be retained in the toy wheelchair 50 in a seated position, thereby allowing a handicapped person that uses a real wheelchair to identify with the handicapped doll 10.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A handicapped doll with removable limbs which comprises:
    a) a torso having a head attached thereto;
    b) limbs extending from said torso;
    c) means for adjusting and detaching portions of limbs at major joint locations, so that a handicapped person can identify with and relate to said handicapped doll, wherein each said adjusting and detaching means is a snap fastener pivot joint for removably attaching portions of said limbs at said major joint locations and having two drive screws to hold each of the two parts of said snap fastener pivot joint to said doll, and wherein said limbs are an arm in which the major joint locations are at a shoulder, an elbows and a wrists and a leg in which the major joint locations are at a thigh, a knee and an ankle; and d) a snap cover to fit upon one of said shoulder joint locations, when said arm is detached at said shoulder from said torso.

2. A handicapped doll with removable limbs as recited in claim 1, further including a simulated bandage cap to fit upon one of said portions of limbs.

3. A handicapped doll with removable limbs as recited in claim 1, further including a hair piece removably attachable to said head of said doll.

4. A handicapped doll with removable limbs as recited in claim 1, further including:

a) a toy wheelchair;
b) a first strip of a mating hook/loop pile fabric fastener attached to a back rest of said toy wheelchair; and
c) a second strip of a mating hook/loop pile fabric fastener attached to a back of said torso, so that said handicapped doll can be retained in said toy wheelchair in a seated position, thereby allowing a handicapped person that uses a real wheelchair to identify with said handicapped doll.

* * * * *